(12) United States Patent
Stahl

(10) Patent No.: US 10,150,129 B2
(45) Date of Patent: Dec. 11, 2018

(54) PAINT APPLICATION DEVICE

(71) Applicant: Cefla Deutschland GmbH, Meckenheim (DE)

(72) Inventor: Gerhard Stahl, Bad Neuenahr-Ahrweiler (DE)

(73) Assignee: CEFLA DEUTSCHLAND GMBH, Meckenheim (DE)

( * ) Notice: Subject to any disclaimer, the term of this patent is extended or adjusted under 35 U.S.C. 154(b) by 260 days.

(21) Appl. No.: 14/159,097

(22) Filed: Jan. 20, 2014

(65) Prior Publication Data

US 2014/0212573 A1 Jul. 31, 2014

(30) Foreign Application Priority Data

Jan. 30, 2013 (DE) .................. 10 2013 201 487

(51) Int. Cl.
| | |
|---|---|
| *B05B 12/20* | (2018.01) |
| *C09D 7/00* | (2018.01) |
| *B05D 3/00* | (2006.01) |
| *B05B 12/10* | (2006.01) |
| *G05D 24/02* | (2006.01) |
| *C09D 7/20* | (2018.01) |
| *B05B 14/00* | (2018.01) |

(52) U.S. Cl.
CPC .............. *B05B 12/10* (2013.01); *B05B 14/00* (2018.02); *B05D 3/007* (2013.01); *C09D 7/20* (2018.01); *G05D 24/02* (2013.01)

(58) Field of Classification Search
CPC ..... B05B 12/10; B05B 15/0406; B05D 3/007; C09D 7/001; G05D 24/02
See application file for complete search history.

(56) References Cited

U.S. PATENT DOCUMENTS

| | | | |
|---|---|---|---|
| 2,848,353 A | 8/1958 | Norris | |
| 4,132,357 A | 1/1979 | Blackinton | |
| 4,440,647 A * | 4/1984 | Puchalski | C08L 79/02 134/10 |
| 4,574,005 A * | 3/1986 | Cobbs, Jr. | B01D 53/14 95/191 |

(Continued)

FOREIGN PATENT DOCUMENTS

| | | |
|---|---|---|
| DE | 2726429 A1 | 1/1978 |
| DE | 3135721 C2 | 4/1991 |

(Continued)

OTHER PUBLICATIONS

European Search Report dated Apr. 30, 2014 for European application No. 14152119.

*Primary Examiner* — Dah-Wei D. Yuan
*Assistant Examiner* — Kristen A Dagenais-Englehart
(74) *Attorney, Agent, or Firm* — Ohlandt, Greeley, Ruggiero & Perle, LLP

(57) ABSTRACT

A paint application device, in particular suited for the application of water-dilutable paints, comprises a paint reservoir connected with a paint application device via a supply line. Further, a paint discharge device for returning excess paint from the area of the paint application device into paint reservoir is provided. For the adjustment or the maintenance of the viscosity of the paint, a humidification device is provided for increasing the air humidity in the area of the paint application device and/or in the paint reservoir.

11 Claims, 2 Drawing Sheets

(56) References Cited

U.S. PATENT DOCUMENTS

| | | | |
|---|---|---|---|
| 5,167,714 A | 12/1992 | Gimben et al. | |
| 6,168,664 B1 | 1/2001 | Heine | |
| 9,321,069 B2 | 4/2016 | Swoboda | |
| 2002/0192388 A1* | 12/2002 | Yamauchi | B05D 1/02 |
| | | | 427/377 |
| 2009/0134241 A1 | 5/2009 | Hoffmann | |

FOREIGN PATENT DOCUMENTS

| | | |
|---|---|---|
| DE | 4143025 | 7/1993 |
| DE | 19741096 A1 | 3/1999 |
| DE | 10127469 A1 | 12/2002 |
| DE | 102006037127 A1 | 2/2008 |
| DE | 102010021209 A1 | 11/2011 |
| DE | 102010030280 A1 | 12/2011 |
| EP | 0618015 A1 | 10/1994 |
| EP | 0347752 B1 | 11/1995 |
| EP | 0855226 | 7/1998 |
| EP | 2065101 | 6/2009 |
| EP | 2253384 A1 | 11/2010 |
| EP | 2368642 A1 | 9/2011 |
| EP | 2529845 A1 | 12/2012 |
| KR | 20090053452 | 5/2009 |
| WO | 2012076117 | 6/2012 |
| WO | WO-2012076117 A1 * | 6/2012 ......... B05B 15/1225 |

\* cited by examiner

PAINT APPLICATION DEVICE

CROSS REFERENCE TO RELATED APPLICATIONS

The present disclosure claims the priority of German Patent Application no. DE 10 2013 201 487.2 filed on Jan. 30, 2013, the disclosures of which are incorporated herein by reference.

BACKGROUND OF THE DISCLOSURE

1. Field of the Disclosure

The disclosure relates to a paint application device, in particular for the application of water-dilutable paints, where the term "paints" covers any kind of surface coating using in particular water-dilutable materials.

2. Description of the Prior Art

For instance for the purpose of coating elongated work pieces, such as boards and the like, it is known to apply paints, lacquers or the like on the surfaces by means of coating heads or spray heads, for example. A spray head, suitable in particular for the application of water-dilutable paints or coatings, is described in EP 10 162 699.2, for example. In this case, the paint is supplied into a chamber through which the work piece to be coated is passed. Excess coating material is withdrawn from the chamber, in which in particular a vacuum prevails, and is supplied to a paint reservoir. From the paint reservoir, the paint is supplied to the spray head again by a pump or the like. Although this is a substantially closed circuit, it cannot be avoided that a part of the solvent contained in the paint, such as water, evaporates thereby causing a change in the viscosity of the paint. Owing to this increase in viscosity, the paint becomes more viscous so that a uniform spraying of the paint in the spray head, and thus in particular an application of thin layers of paint and/or of exact application quantities, is no longer reliably ensured. Further, a clogging of the spray head and the like can occur. For this purpose it is known to supply a solvent to the paint reservoir by opening a valve. This is also the case with highly viscous paints. This is very troublesome and difficult, especially with water-dilutable paints, since the water often remains on the surface of the paint and mixing or stirring it into the same is troublesome.

SUMMARY OF THE DISCLOSURE

It is an object of the disclosure to provide a paint application device suited in particular for water-dilutable paints, with which the viscosity of a paint can be changed or can be maintained despite a change in a simple manner. Further, it is an object of the disclosure to provide a corresponding method.

The paint application device of the present disclosure, which is suitable in particular for working with water-dilutable paints, lacquers and coating agents, comprises a paint reservoir. The paint reservoir is connected with a paint application device via a supply line, the device comprising a spray head or the like, for example. Here, paint application devices such as described in EP 10 162 699.2, for example, are suitable. Further, a paint discharge device for the discharge of excess paint from the area of the paint application device to the paint reservoir is provided.

The paint discharge device may comprise a pump or suction means, for example, wherein, in particular in the preferred use of a suction device, a vacuum is generated in a coating chamber of the paint application device. According to the disclosure, further, a humidification device is provided to increase air humidity in the area of the paint application device and/or in the paint reservoir. Via such a humidification device, the paint circuit is supplied with water vapor, for example. Of course, another solvent than water in the form of vapor can be supplied. Such a supply of a solvent such as water, as a solvent vapor is advantageous in that it is absorbed more easily by the paint so that the viscosity of the paint can thereby be maintained or changed in a simple manner. No stirring in of the solvent in the paint reservoir is required.

According to the disclosure the humidification device can be provided in the area of the paint application device. If, for example, the paint application device is a spray gun, the area in which the humidification device is provided encompasses the area in which the spray mist is produced by the spray gun. In particular this ensures that the solvent vapor can be introduced into the spray mist to a sufficient degree. However, if the paint application device is a coating chamber, for example, the humidification device is arranged within the chamber, preferably, however, in the vicinity of the spray heads. In any case, the arrangement of the humidification device in the area of the paint application device ensures that the solvent vapor introduced mixes with the spray mist produced.

The paint application device may be one or a plurality of spray guns, for example, with which the water-dilutable paint, lacquer or the like is applied onto a work piece. Here, instead of suctioning or pumping, the paint discharge device may effect a draining of excess paint, for example via inclined, possibly cooled plates. Further, the paint discharge device may be a plate on which excess paint deposits and accumulates, with the paint being removed from the plate using a wiper or the like, for example. According to the disclosure, such a paint application device, as well as such a paint discharge device is also provided with a humidification device in the area of the paint application device or in a paint reservoir for the purpose of increasing the air humidity.

By means of the paint application device designed according to the disclosure it is possible to very exactly define or adjust the amount of paint applied. Thus, short drying times or short drying distances can be realized. Moreover, the present paint application device has the decisive advantage that the viscosity can be controlled very exactly. Thereby, it is possible to increase the proportion of solids in the paint or the lacquer or in another coating agent. This, in turn, results in a shortening of the drying times or drying distances.

In order to be able to control the adjustment of the supplied amount or the saturation of the solvent vapor as accurately as possible, a viscosity gage is preferably provided, the viscosity gage preferably being arranged in the supply line to the paint application device. Depending on the measured viscosity, the humidification device, and thus the amount of solvent vapor supplied, can be controlled in particular by means of a control device.

In a particularly preferred embodiment the present paint application device preferably comprises a cooling device. Preferably, the cooling device is arranged downstream of the paint application device, seen in the flow direction. Thus, the cooling device cools the mixture of solvent vapor introduced via the humidification device and excess paint withdrawn from the application device. In this context, it is particularly preferred that the cooling device cools a surface where the mixture of excess paint and solvent vapor condenses. A particularly suitable cooling surface is a surface in the paint reservoir, such as a wall surface of the paint reservoir. In a particularly preferred embodiment, the control device preferably provided thus controls both the humidification device and the cooling device in dependence on the viscosity measured by the viscosity gage. The control device allows the control of both the amount of solvent vapor supplied and of the temperature of the cooling surface.

According to the present method for adjusting the viscosity of in particular water-dilutable paints and the like, the paint viscosity is measured. In an area in which the paint is applied onto a work piece, solvent vapor is supplied. As an alternative or in addition, solvent vapor can be supplied in an area in which the paint is provided, in particular in the paint reservoir. Preferably, the solvent vapor is water vapor, while it is also possible to provide vapor of another solvent. According to the disclosure, the humidity is adjusted via the amount or saturation of the introduced solvent vapor in dependence on the measured viscosity. Due to the supply of solvent vapor as provided by the disclosure, the viscosity of the paint can be adjusted in a simple manner even without providing stirring devices. The humidity is defined by the saturation of the solvent vapor, in particular the water vapor.

In a particularly preferred development of the present method, the solvent vapor supplied is preferably cooled. This cooling, effected in particular via a cooling plate, causes the solvent vapor or a mixture of excess paint and the solvent vapor to condense. Thereby, the solvent is introduced into the paint in a simple manner.

It is preferred to supply solvent vapor when a predetermined viscosity value is exceeded. Therefore, it is particularly preferred to not only control the humidity via the amount of the solvent vapor introduced or the saturation thereof, but to also control the temperature of a cooling device, both as a function of the viscosity measured. In this context it is possible that the humidity or the amount of the solvent vapor supplied can be changed only in a step-wise manner, for example, because a finer adjustment is made through the temperature.

It is particularly preferred to use the paint application device of the present disclosure for the implementation of the method of the present disclosure.

BRIEF DESCRIPTION OF THE DRAWINGS

A full and enabling disclosure of the present disclosure, enabling one of ordinary skill in the art to carry out the disclosure, is set forth in greater detail in the following description, including reference to the accompanying drawing in which.

DETAILED DESCRIPTION OF PREFERRED EMBODIMENTS

Figure 1:
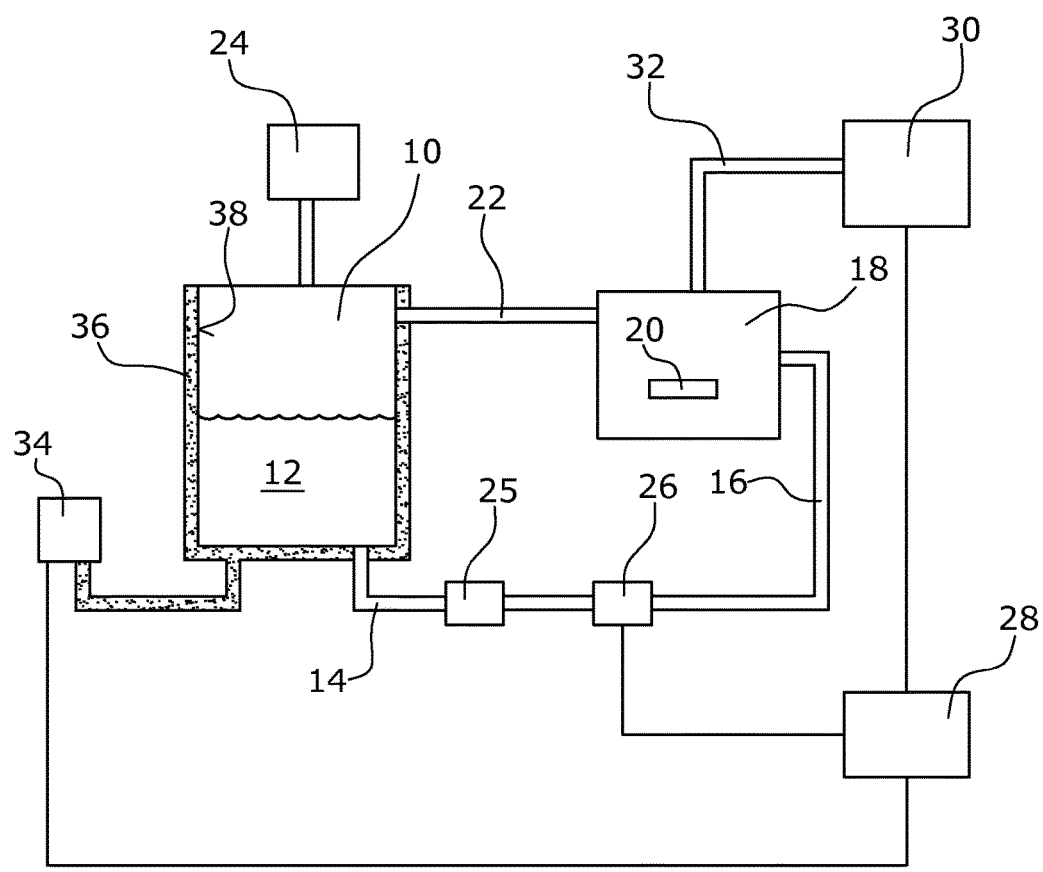
FIG. 1 is a simplified schematical illustration of a first embodiment of the paint application device of the present disclosure.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the disclosure to the particular form disclosed, but are merely illustrative and intended to teach one of ordinary skill how to make and/or use the disclosure claimed herein.

A paint reservoir 10 holds a paint 12, in particular a water-dilutable paint. The paint reservoir 10 is connected with a pump via a line 14 and the pump is connected with a paint application device 18 via a line 16. The paint application device 18 may comprise a spray head, for example. A work piece 20 to be coated or a work piece 20 to be passed through a chamber of the paint application device 18 is arranged in the paint application device 18. Excess paint is discharged from the area of the paint application device 18 via a line 22 and is returned to the paint reservoir 10. The discharge of excess paint from the area of the paint application device 18 can be effected by suctioning, for example. For this purpose a suction device 24 is connected with the paint reservoir 10. Excess material is drawn off via the suction device 24, wherein a certain vacuum is possibly generated in a chamber of the paint application device 18.

In the embodiment illustrated, a viscosity gage 26 is arranged in the supply line 16 between a pump 25 and the paint application device 18. A control device 28 is electrically connected with the viscosity gage 26. Further, a humidification device 30 is electrically connected with the control device 28 and is thus adapted to be controlled by the control device 28. In the embodiment illustrated, the humidification device 30 is connected with the paint application device 10 and serves to supply solvent vapor, specifically water vapor, via a line 32 to the area of paint application and in particular to the area in which excess paint is drawn off. Thus, a mixture of excess paint and vapor is supplied to the paint reservoir 10 via the line 22.

Further, the paint application device of the present disclosure comprises a cooling circuit. By means of a cooling device 34, comprising in particular a pump, a coolant such as water can be provided in a cooling jacket 36 surrounding the paint reservoir 10. The cooling device effects a cooling of an inner wall 38 of the paint reservoir 10. The mixture of vapor and excess paint reaching the paint reservoir 10 via the line 22 is condensed at the cooled wall 38. Specifically the condensed water vapor flows downward along the inner wall 38 and thus mixes well with the paint 12 present in the paint reservoir 10 so that the viscosity of the paint 12 is changed.

The cooling device 34 is also connected with the control 28. For a control of the paint application device of the present disclosure, the control device performs a control of the temperature of the coolant and/or a control of the vapor amount supplied, both controls being made in dependence on the viscosity measured.

Figure 2:
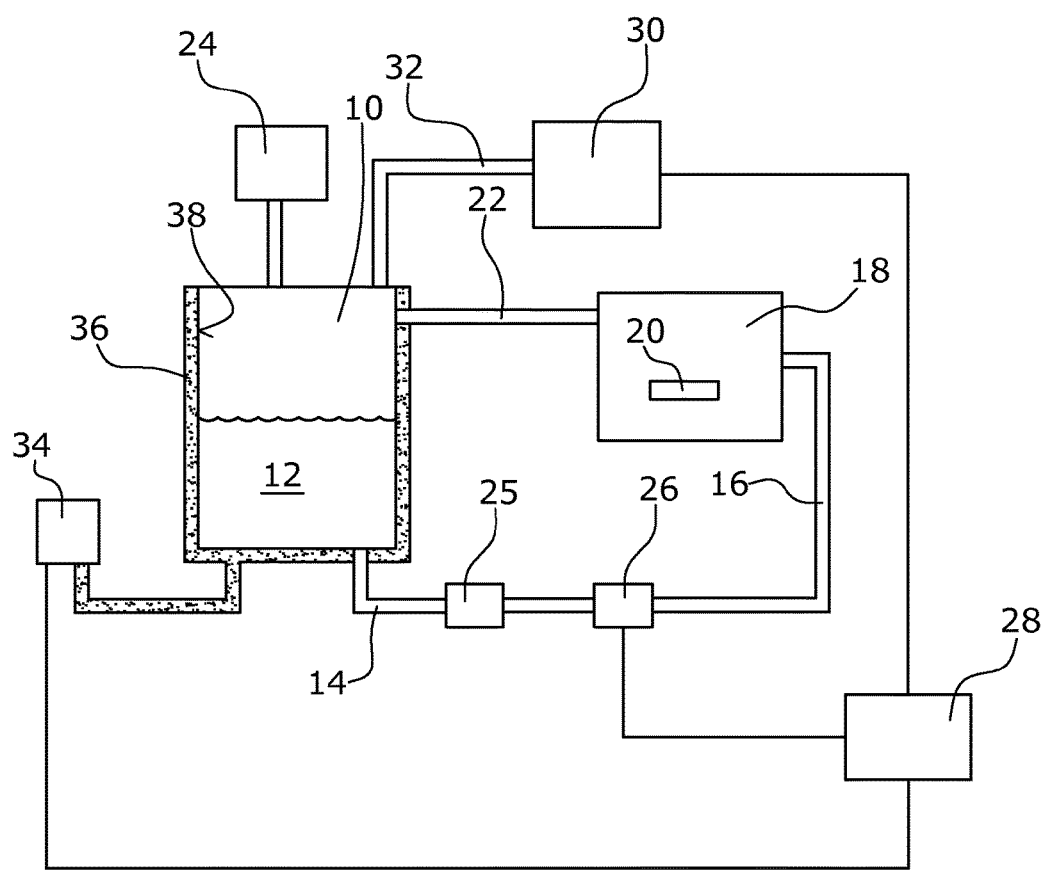
FIG. 2 is a simplified schematical illustration of a second embodiment of the paint application device of the present disclosure.

FIG. 2 shows a second embodiment wherein same parts are denoted by same reference signs. In the second embodiment the humidification device 30 is connected to the paint reservoir 10.

All references cited herein are incorporated by reference to the full extent to which the incorporation is not inconsistent with the express teachings herein.

Although the disclosure has been described and illustrated with reference to specific illustrative embodiments thereof, it is not intended that the disclosure be limited to those illustrative embodiments. Those skilled in the art will recognize that variations and modifications can be made without departing from the true scope of the disclosure as defined by the claims that follow. It is therefore intended to include within the disclosure all such variations and modifications as fall within the scope of the appended claims and equivalents thereof.

What is claimed is:

1. A method for adjusting viscosity of a paint, comprising the following steps:

measuring the paint viscosity, supplying an amount of solvent vapor to an area where the paint is applied onto a work piece or in which the paint is provided, adjusting the amount of solvent vapor supplied in dependence on the viscosity measured, cooling a mixture of the solvent vapor and the paint by cooling a surface arranged in a location selected from the group consisting of in a paint reservoir, at a wall of the paint reservoir, in the area, and any combinations thereof, the cooling causing condensation, and adjusting the cooling temperature in dependence on the viscosity measured.

2. The method of claim 1, wherein the solvent vapor is supplied from the time of exceeding a predetermined viscosity value.

3. The method of claim 1, wherein the step of supplying solvent vapor to the area where the paint is applied onto the work piece or in which the paint is provided comprises supplying solvent vapor to the area where the paint is applied onto the work piece.

4. The method of claim 3, further comprising drawing off excess paint from the area and returning the drawn off excess paint to a paint reservoir.

5. The method of claim 4, wherein the step of supplying solvent vapor comprises supplying the amount of the solvent vapor where the excess paint is drawn off from the area so that a mixture of excess paint and solvent vapor is supplied to the paint reservoir.

6. The method of claim 1, wherein the solvent vapor is water vapor.

7. A method for adjusting viscosity of a paint, comprising the following steps:

supplying paint from a paint reservoir to a paint application device in an area via a supply line;

measuring a viscosity of the paint in the supply line;

drawing off excess paint from the area and returning the excess paint to the paint reservoir;

supplying solvent vapor based on the viscosity to the area so that a mixture of excess paint and solvent vapor is returned to the paint reservoir;

cooling the mixture of the solvent vapor and the paint at a cooling temperature to condense the mixture by cooling a surface arranged in a location selected from the group consisting of in a paint reservoir, at a wall of the paint reservoir, in the area, and any combinations thereof; and adjusting the cooling temperature based on the measured viscosity.

8. The method of claim 7, wherein the step of supplying the solvent vapor comprises supplying the solvent vapor to the area in a region where the excess paint is drawn off from the area.

9. The method of claim 7, wherein the step of supplying the solvent vapor comprises supplying the solvent vapor to the area in a region where the paint applied by the paint application device.

10. The method of claim 7, wherein the solvent vapor is water vapor.

11. A method for adjusting viscosity of a paint, comprising the following steps:

measuring the paint viscosity in a supply line between a pump and a paint application device via viscosity gage;

supplying an amount of solvent vapor to an area where the paint is applied onto a work piece or in which the paint is provided;

cooling a mixture of the solvent vapor and the paint at a cooling temperature by cooling a surface arranged in a location selected from the group consisting of in a paint reservoir, at a wall of the paint reservoir, in the area, and any combinations thereof; and adjusting, in dependence on the viscosity measured, the amount of solvent vapor supplied and the cooling temperature.

* * * * *